United States Patent [19]

Georlette et al.

[11] 4,425,443

[45] Jan. 10, 1984

[54] COMPOSITION COMPRISING A VINYLIDENE FLUORIDE POLYMER AND A BLOWING AGENT

[75] Inventors: Pierre Georlette, Hamme-Mille; Jean Leva, Limelette, both of Belgium

[73] Assignee: Solvay & Cie (Société Anonyme), Brussels, Belgium

[21] Appl. No.: 351,621

[22] Filed: Feb. 24, 1982

[30] Foreign Application Priority Data

Feb. 24, 1981 [FR] France ................................. 81 03899

[51] Int. Cl.³ ............................................. C08J 9/08
[52] U.S. Cl. ...................................... 521/93; 521/79; 521/97; 521/145
[58] Field of Search .................... 521/93, 97, 79, 145

[56] References Cited

U.S. PATENT DOCUMENTS

| | | | |
|---|---|---|---|
| 3,770,662 | 11/1973 | Hennessy et al. | 521/145 |
| 3,808,300 | 4/1974 | Hiyamoto et al. | 521/79 |
| 3,868,337 | 2/1975 | Gros | 521/93 |

FOREIGN PATENT DOCUMENTS

| | | |
|---|---|---|
| 2827396 | 9/1980 | Fed. Rep. of Germany . |
| 1574796 | 7/1969 | France . |

*Primary Examiner*—Morton Foelak
*Attorney, Agent, or Firm*—Spencer & Frank

[57] ABSTRACT

Moulding composition comprising a vinylidene fluoride polymer and a blowing agent which is a hydroxycarboxylic acid or an alkali metal salt derived from one of the acids.

9 Claims, No Drawings

COMPOSITION COMPRISING A VINYLIDENE FLUORIDE POLYMER AND A BLOWING AGENT

BACKGROUND OF THE INVENTION

The present invention relates to a composition comprising a vinylidene fluoride polymer, such as polyvinylidene fluoride, and a blowing agent, and also to a process for the manufacture of cellular or dense articles from this composition.

It has already been proposed to produce compositions comprising a polymer derived from vinylidene fluoride, and a blowing agent, which can be used for moulding finished or semi-finished articles of cellular structure.

Thus, German Patent Application No. 2,827,396, filed on June 22nd, 1978 in the name of PCUK-PRODUITS CHIMIQUES UGINE KUHLMANN, divulges, in Example 17, a composition consisting of polyvinylidene fluoride containing 1% by weight of a blowing agent, in this case azodicarbonamide.

According to this example, this composition does not permit the injection moulding of cellular articles of acceptable quality, because they have blackish streaks which are evidence of thermal degradation of the polymer. To avoid this unacceptable disadvantage, according to this same example, it is appropriate to incorporate 1% by weight of low-density polyethylene and 1% by weight of polytetrafluoroethylene into the moulding composition. However, these ingredients are capable of modifying certain properties of the finished articles, and it is not therefore possible for the compositions in which they are present to be used for every application.

It is therefore apparent that it is not sufficient to incorporate a conventional blowing agent into a vinylidene fluoride polymer for manufacturing cellular articles.

SUMMARY OF THE INVENTION

The aim of the present invention is to provide a moulding composition comprising a vinylidene fluoride polymer and a blowing agent, which is suitable for moulding cellular articles and which does not have the disadvantages of the known compositions.

For this purpose, the invention relates to a moulding composition comprising a vinylidene fluoride polymer and a blowing agent comprising a hydroxycarboxylic acid or an alkali metal salt derived from one of these acids, having a thermal decomposition temperature below the thermal degradation temperature of the polymer.

In fact, a composition of this type does not exhibit any degradation when it is moulded, even under severe operating conditions.

DETAILED DESCRIPTION OF THE INVENTION

The expression "vinylidene fluoride polymer" is understood as denoting both vinylidene fluoride homopolymers and copolymers containing units derived from this monomer. In the latter case, the comonomers can be any monomer which can be polymerised by free-radical polymerisation, such as unsubstituted olefines, vinyl esters and acrylic acid esters. Preferably, the comonomers are halogenated olefines and more particularly polyhalogenated olefines. Good results have been obtained with ethylene or propylene substituted by at least two fluorine atoms, and more particularly with monochlorotrifluoroethylene and hexafluoropropylene.

The proportion of units derived from vinylidene fluoride in the polymers is generally greater than 10% and preferably greater than 50%. The composition can also consist of a mixture of homopolymers and copolymers. If appropriate, it can contain other fluorinated or non-fluorinated polymers, preferably in amounts of less than 20% by weight.

Examples which may be mentioned of blowing agents suitable for the composition according to the invention are malic acid, lactic acid, citric acid, monosodium tartrate, sodium lactate and monosodium citrate. Amongst these blowing agents, alkali metal citrates are preferred.

Very good results have been obtained when the blowing agent comprises sodium bicarbonate in addition to the hydroxycarboxylic acid or the alkali metal salt derived from one of these acids.

The composition according to the invention generally contains from 0.05 to 20% and preferably from 0.1 to 2% by weight of blowing agent, relative to the weight of the vinylidene fluoride polymer, but it can also prove useful to employ larger amounts of blowing agent for certain particular applications.

It is easy to determine experimentally, in each particular case of application, the amount of blowing agent to be incorporated into the composition for an article having the desired density.

If the blowing agent is a mixture of monosodium citrate and sodium bicarbonate, a weight ratio of the monosodium citrate to the sodium bicarbonate in the mixture of between 5 and 9 has proved particularly advantageous.

The composition according to the invention can also contain other customary additives such as plasticisers, stabilisers, lubricants, fillers, dyestuffs or pigments. It can also prove very advantageous to incorporate a nucleating agent into the composition. Examples which may be mentioned of such nucleating agents are zinc oxide and calcium carbonate in powder form. The amount of nucleating agent is generally less than 2% by weight of the weight of vinylidene fluoride polymer.

In general, to produce finished or semi-finished cellular articles from the composition according to the invention, the latter is introduced into a moulding machine and heated to a temperature above the thermal decomposition temperature of the blowing agent, but below the thermal degradation temperature of the vinylidene fluoride polymer, at a pressure which is usually between 1 and 20 bars, before it is moulded.

The moulding composition according to the invention can be prepared in situ at the time of use, for example by continuously introducing a metered amount of its constituents into the feed system of a moulding machine.

In general, however, it is preferred to produce the moulding composition in advance and convert it to a form which can be packed, transported and, if appropriate, stored before use.

In this case, and in a first process, the moulding composition can be produced by cold compaction of the blowing agent or agents with the polymer derived from vinylidene fluoride, in the pulverulent state.

In a second process, the moulding composition can be converted to granules by extrusion, that is to say by introducing appropriately metered amounts of its constituents into the hopper of an extruder and by granulating the extrudate produced. However, it is appropriate in this case to extrude the composition to be granulated at a sufficiently high temperature to cause the polymer to melt, but at a sufficiently low temperature to prevent premature thermal decomposition of the blowing agent.

If the vinylidene fluoride polymer has a minimum extrusion temperature which is equal to or greater than the thermal decomposition temperature of the selected blowing agent, as is the case, for example, if the polymer is a vinylidene fluoride homopolymer and the blowing agent is monosodium citrate, it is not possible to employ the technique of granulation by extrusion in order to convert the composition; however, the technique of cold compaction can advantageously be used.

The composition according to the invention can advantageously be produced from a master mixture of the polymer derived from vinylidene fluoride and of the blowing agent, containing a high proportion, which is more than 20% and can range up to 50% by weight, of the blowing agent. An appropriate proportion of this master mixture is then dispersed in the polymer, to which the other constituents of the composition have been added if appropriate.

When preparing a master mixture, it is possible to use a blowing agent having a thermal degradation temperature below the minimum extrusion temperature of the polymer.

In fact, in this case, the master mixture can be produced by starting from another vinylidene fluoride polymer having a minimum extrusion temperature below the thermal decomposition temperature of the blowing agent, and then by dispersing the granules thus obtained in granules of the vinylidene fluoride polymer having a high minimum extrusion temperature.

Thus, to produce a composition based on a vilylidene fluoride homopolymer and monosodium citrate, it is possible to granulate the monosodium citrate with a vinylidene fluoride copolymer containing a high or low proportion of units derived from monochlorotrifluoroethylene or hexafluoropropylene, these copolymers having a minimum extrusion temperature below the thermal decomposition temperature of the monosodium citrate, and then to mix the granules thus obtained with an appropriate proportion of polyvinylidene fluoride granules.

The composition according to the invention is particularly suitable for the extrusion moulding or injection moulding of finished or semi-finished articles of cellular structure. In fact, it is found that the articles thus produced have a uniform cellular structure and are free of any apparent or non-apparent degradation. The bulk density of the articles produced can vary between 0.7 and 1.7 g/cm$^3$, depending on the processing conditions and the moulding composition used.

The composition according to the invention is also particularly recommended for the injection moulding of articles of very slightly cellular structure. In this case, the amount of blowing agent incorporated into the composition is relatively small. In fact, it is found that the objects moulding from a composition of this type do not show a tendency towards localised shrinkage after release from the mould.

Moreover, it has been found that the compositions according to the invention lead to products of dense or cellular structure which have a distinctly lower dielectric constant than that of the products obtained from compositions not containing a blowing agent. This property proves particularly valuable for certain applications such as the covering of telephonic transmission cables. In this case, these compositions according to the invention make it possible to produce cables which exhibit virtually no interference phenomenon between the different conductors.

The composition according to the invention is illustrated by the practical examples which follow.

EXAMPLE 1 (comparison)

In this example, which is a comparison example, a composition containing a conventional blowing agent is used.

A mixture comprising the following ingredients, given in parts by weight:

Polyvinylidene fluoride (trademark SOLEF, type 1008): 100
Azodicarbonamide: 0.3
Sodium bicarbonate: 0.1
Zinc oxide: 0.1
Talc: 0.5 is prepared by cold compaction.

A cellular cube is injection-moulded from this composition at 230° C. It is found that the article produced has a bulk density of 1.3 g/cm$^3$, but has a deep brown coloration, which is evidence of substantial degradation of the polymer.

EXAMPLE 2

A mixture comprising the following ingredients, given in parts by weight:

Polyvinylidene fluoride (trademark SOLEF, type 1008): 100
Monosodium citrate: 0.3
Sodium bicarbonate: 0.1
Zinc oxide: 0.1
Talc: 0.5 is prepared by cold compaction.

A cube of cellular structure is injection-moulded from this composition as in Example 1.

It is found that the article produced has a bulk density of 1.3 g/cm$^3$ and has a yellow-white coloration, which is customary for polyvinylidene fluoride articles. The moulded article does not therefore show any trace of thermal degradation of the polymer.

EXAMPLE 3

A master mixture having the following composition, given in parts by weight:

Vinylidene fluoride/hexafluoropropylene copolymer containing
10% by weight of hexafluoropropylene 100
Monosodium citrate 3
Zinc oxide 1 is produced by conversion to granules by extrusion at 160° C.

The granules thus obtained are mixed with polyvinylidene fluoride granules in a weight ratio of 1 to 10.

Mouldings of dense structure, such as containers, are injection-moulded at 230° C. from the composition thus obtained. It is found that the mouldings have a yellow-white coloration and do not undergo any localised shrinkage during cooling.

EXAMPLE 4

A slab of cellular structure, having a density of 1.31 g/cm$^3$, is injection-moulded at 230° C. from the formulation described in Example 3, and the dielectric constant is measured at 23° C. for frequencies of 60 Hz and 100 Hz. The constants measured are respectively 4.8 and 4.4.

A similar slab of dense structure, having a density of 1.81 g/cm$^3$, is moulded from polyvinylidene fluoride, trademark Solef and type 1008, and the dielectric constant is measured at 28° C. for frequencies of 60 Hz and 100 Hz. The constants measured are respectively 8.8 and 8.1.

It is therefore apparent that the compositions according to the invention lead to products having a lower dielectric constant.

We claim:

1. Composition comprising a vinylidene fluoride polymer and a blowing agent, wherein the blowing agent comprises a hydroxycarboxylic acid or an alkali metal salt derived from one of these acids, having a thermal decomposition temperature below the thermal degradation temperature of the polymer.

2. Composition according to claim 1, wherein the blowing agent comprises an alkali metal citrate.

3. Composition according to claim 1 or 2, wherein the blowing agent also comprises sodium bicarbonate.

4. Composition according to claim 3, wherein the weight ratio of the alkali metal citrate to the sodium bicarbonate is between 5 and 9.

5. Composition according to claim 1, wherein it contains from 0.1 to 2% by weight of blowing agent, relative to the weight of polymer.

6. Composition according to claim 1, wherein it comprises (a) a master mixture of vinylidene fluoride polymer and blowing agent, containing from 20 to 50% by weight of blowing agent, relative to the weight of the polymer, and of (b) an identical or different vinylidene fluoride polymer not containing a blowing agent.

7. Composition according to claim 6, wherein the polymer in the master mixture is a copolymer of vinylidene fluoride and of monochlorotrifluoroethylene or hexafluoropropylene.

8. Composition according to claim 1, wherein the vinylidene fluoride polymer is a homopolymer or a copolymer containing (a) at least 50% of units derived from vinylidene fluoride and (b) ethylene units or propylene units substituted by at least two fluorine atoms.

9. Process for the manufacture of cellular or dense particles comprising employing a composition according to claim 1 as a moulding composition.

* * * * *